United States Patent
Barneron (10) Patent No.: US 9,058,525 B2
(45) Date of Patent: Jun. 16, 2015

(54) DEVICE FOR HOLDING A MAGNETIC READING HEAD

(75) Inventor: Sylvain Barneron, Bourg-les-Valence (FR)

(73) Assignee: Compagnie Indusrielle et Financiere d'Ingenierie "Ingenico", Paris (FR)

(*) Notice: Subject to any disclaimer, the term of this patent is extended or adjusted under 35 U.S.C. 154(b) by 34 days.

(21) Appl. No.: 13/992,583

(22) PCT Filed: Dec. 7, 2011

(86) PCT No.: PCT/EP2011/072006
§ 371 (c)(1),
(2), (4) Date: Aug. 26, 2013

(87) PCT Pub. No.: WO2012/076572
PCT Pub. Date: Jun. 14, 2012

(65) Prior Publication Data
US 2013/0327833 A1  Dec. 12, 2013

(30) Foreign Application Priority Data

Dec. 7, 2010 (FR) .................................... 10 60204
Dec. 7, 2010 (FR) .................................... 10 60208

(51) Int. Cl.
G11B 5/105 (2006.01)
G06K 7/08 (2006.01)
G11B 5/48 (2006.01)
G11B 5/008 (2006.01)

(52) U.S. Cl.
CPC .............. *G06K 7/082* (2013.01); *G11B 5/105* (2013.01); *G06K 7/084* (2013.01); *G11B 5/00808* (2013.01); *G11B 5/48* (2013.01)

(58) Field of Classification Search
CPC ....................................................... G11B 5/105
See application file for complete search history.

(56) References Cited

U.S. PATENT DOCUMENTS

| | | | |
|---|---|---|---|
| 4,628,386 A | 12/1986 | Chabrolle | |
| 5,270,523 A | 12/1993 | Chang et al. | |
| 5,552,947 A * | 9/1996 | Nakanishi et al. | 360/291 |
| 6,487,046 B1 | 11/2002 | Oguchi | |
| 2003/0089773 A1 | 5/2003 | Kanayama | |
| 2004/0104268 A1 | 6/2004 | Bailey | |
| 2005/0236480 A1 | 10/2005 | Vrotsos et al. | |
| 2006/0049255 A1 | 3/2006 | von Mueller et al. | |
| 2007/0187500 A1* | 8/2007 | Lin | 235/449 |
| 2011/0255194 A1* | 10/2011 | Kuan et al. | 360/240 |

FOREIGN PATENT DOCUMENTS

| | | |
|---|---|---|
| CN | 2446589 Y | 9/2001 |
| EP | 0599244 A2 | 6/1994 |

(Continued)

OTHER PUBLICATIONS

International Search Report dated Mar. 14, 2012 for corresponding International Application No. PCT/EP2011/072006, filed Dec. 7, 2011.

(Continued)

*Primary Examiner* — Christle I Marshall
(74) *Attorney, Agent, or Firm* — David D. Brush; Westman, Champlin & Koehler, P.A.

(57) ABSTRACT

A device is provided for supporting a magnetic reading head. The device includes a guide for guiding and cushioning the reading head. The guide is mounted between a base of the reading head and a bearing surface parallel to the base, and includes at least one part made of a material, the Young's modulus of which is greater than 200 N/mm2.

11 Claims, 9 Drawing Sheets

(56) References Cited

FOREIGN PATENT DOCUMENTS

| FR | 2875634 A1 | 3/2006 |
|----|------------|--------|
| GB | 2297417 A  | 7/1996 |
| JP | 1102715    | 4/1989 |

OTHER PUBLICATIONS

Ausias et al., "Micro-Mechanical Model of TPE Made of a Polypropylene and Rubber Waste", Polymer, Elsevier Science Publishers B.V., GB, vol. 48, No. 11, May 11, 2007 pp. 3367-3376, XP022071323.

French Search Report dated Jul. 8, 2011 for corresponding French Application No. FR 1060208, filed Dec. 7, 2010.

French Search Report dated Jun. 22, 2011 for corresponding French Application No. FR 1060204, filed Dec. 7, 2010.

English translation of the Written Opinion dated Mar. 14, 2012 for corresponding International Application No. PCT/EP2011/072006, filed Dec. 7, 2011.

* cited by examiner

DEVICE FOR HOLDING A MAGNETIC READING HEAD

CROSS-REFERENCE TO RELATED APPLICATIONS

This Application is a Section 371 National Stage Application of International Application No. PCT/EP2011/072006, filed Dec. 7, 2011, which is incorporated by reference in its entirety and published as WO 2012/076572 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of devices using a magnetic reading head. More specifically, the invention pertains to the guiding and holding of such a magnetic reading head.

The invention has numerous applications, for example when it is used in payment terminals. More generally, it can be applied in all cases where a magnetic reading head is used.

TECHNOLOGICAL BACKGROUND

Magnetic cards compatible with the ISO 7811 standard comprise a magnetic tape comprising three recording tracks (generally called the ISO 1, ISO 2 and ISO 3 tracks). These tracks can contain information related to the card owner. In particular, information about a bank account, and encrypted data are stored on such tracks.

The use of such magnetic cards is very widespread in the banking field, for making transactions with merchants. During such transactions, a customer's magnetic card is inserted at the end of a slot (into which the end of a magnetic reading head is presented, on one of the faces of the walls forming the slot) in a payment terminal, and a motion of translation of the card is performed (the magnetic card is made to slide in this slot so that the magnetic tape of the card is presented facing the end of the magnetic reading head). Thus, the end of the magnetic reading head goes back into physical contact with the magnetic track of the magnetic card, and it measures the polarization of the magnetic particles on portions of the magnetic track considered (through the translation motion) and deduces binary information therefrom.

During the motion of translation of the magnetic card in the slot of the payment terminal, pressure is exerted on the magnetic reading head by the sliding of the magnetic card. Thus, a reading head must be capable of moving perpendicularly to the axis of translation of a card in the slot. In addition, the passage of a card in the slot may induce a slight tilting of the magnetic reading head in relation to the axis perpendicular to the axis of translation of the card.

In order to stabilize the magnetic reading head during the reading of a card, it proves to be necessary to use a device for holding such a head (in order to limit the above-mentioned movement, this function being called a function of "guiding the magnetic reading head") which also, once the card has passed, makes it possible to reposition the magnetic reading head in its original position (this function is called the function of "returning or cushioning of the magnetic reading head").

Different types of approaches are known in the prior art to control the guiding and return of the magnetic head. The following patent documents, CN2446589YY, FR2875634, GB2297417A, JP6349035A, JP63302410A, U.S. Pat. No. 4,628,386 A1, U.S. Pat. No. 5,270,523 A1, U.S. Pat. No. 5,552,947 A1, U.S. Pat. No. 6,487,046 B1, thus present different techniques for making devices for holding a magnetic reading head.

However, these different techniques have several drawbacks.

In particular, these approaches require the use of numerous metal parts (namely spring wires or vertical strips acting as springs) which, when manufacturing devices for holding a magnetic reading head, require the use of assembling methods that are complicated to implement.

SUMMARY OF THE INVENTION

One particular embodiment of the invention proposes a device for holding a magnetic reading head. This device is characterized in that it comprises a means for guiding and cushioning said reading head, mounted between a base of the reading head and a supporting plane parallel to said base, comprising at least one part made out of a material possessing a modulus of elasticity greater than 200 N/mm$^2$.

The general principle of the invention therefore consists in integrating, into a means for guiding and cushioning, at least one part made out of an elastomer material providing for a spring function (which dampens the motions of translation of the reading head along an axis perpendicular to the supporting plane and which also enables slight rotations of the reading head along this same axis), the magnitude of which varies according to the choice of the shape of such a part.

Thus, this particular embodiment of the invention relies on a wholly novel and inventive approach as compared with the above-mentioned prior art, because it does not require the use of numerous metal parts necessitating the use for example of pins or welds to attach these elements to one another. The costs of manufacture as well as the space requirement of the guiding and cushioning means are therefore reduced.

Advantageously, in such a device, the material belongs to the group comprising silicones and thermoplastic elastomers.

This list is obviously not exhaustive.

Advantageously, a device of this kind is characterized in that said means for guiding and cushioning form a structure entirely made of a material having a modulus of elasticity of over 200 N/mm$^2$.

Thus, since the means for guiding and cushioning constitutes one and the same part, it can be made by a molding method which is particularly advantageous from a viewpoint of manufacturing cost.

This device can be obtained in various ways, for example by molding or again by extrusion and then cutting out.

Thus, since the means for guiding and cushioning are entirely made out of a material possessing a modulus of elasticity greater than 200 N/mm$^2$, it is possible to easily choose its shape in order to facilitate its integration into any unspecified device.

Advantageously, such a device is characterized in that the means for guiding and cushioning comprise at least one supporting part resting on the supporting plane made out of an elastomer material and having a cylindrical shape, the bases of which are positioned perpendicularly to the supporting plane.

Thus, through the use of such a cylinder-shaped supporting part, the guiding and cushioning means possess an elastic effect (also called a spring effect) that is increased (because of the shape and type of material chosen) when a force is exerted on it.

Advantageously, a device of this kind is characterized in that said at least one cylinder-shaped supporting part is hollow.

Thus, by choosing a hollow, cylinder-shaped supporting part of this kind, we obtain a supporting part that possesses an optimal deformation capacity. The flexibility of such a supporting part is therefore increased. Consequently, the functions of the guiding and returning of the magnetic reading head are thereby improved.

Furthermore, in this embodiment, fewer materials are used to make such a supporting part and therefore the costs of production are reduced (while at the same time accentuating the technical effect).

Advantageously, such a device is characterized in that the device comprises two said cylinder-shaped supporting parts which are similar and mounted so as to be parallel to each other.

Thus, by using two such supporting parts mounted in parallel with each other, it is possible to reduce the dimensions of these parts.

Furthermore, the spring effect of the means for guiding and cushioning is increased through the combination of several supporting parts. The fact of positioning them in parallel and facing each other accentuates the reactivity of the means for guiding and cushioning when pressure is exerted on the magnetic reading head.

Furthermore, by choosing similar supporting parts (similar in shapes, dimensions and materials), the underlying support of the base of the reading head is balanced to the utmost.

Advantageously, a device of this kind is characterized in that said means for guiding and cushioning comprise a part for receiving the base of the reading head, resting on said at least one supporting part.

Thus, by using a part for receiving of this kind, the reading head is even more stable than in previous embodiments of the invention.

Advantageously, a device of this kind is characterized in that said part for receiving possesses a housing in which the reading head is embedded.

Thus, by using a part for receiving that possesses a housing (or cavity) of this kind, optimum stability is ensured for the magnetic reading head. Because a part for receiving of this kind is adjusted with, for example, the base of the reading head, it is not necessary for this part for receiving to have a plane surface. Thus, it is possible to widen the choice of the shape of this part for receiving according to production constraints (shape of a mold, etc). Furthermore, from a security point of view, an attacker is obliged to carry out a more invasive attack to access the magnetic reading head.

Advantageously, such a device is characterized in that said part for receiving has a through aperture enabling the passage of a connection element connected to the reading head.

Thus, this embodiment of the invention enables the use of any magnetic reading head whatsoever that is available on the market (without carrying out any machining operations) by the use of the through aperture making it possible for example to pass through a ribbon cable connector to power and control the reading head.

In another embodiment of the invention, a magnetic card reader is proposed comprising a device for holding a magnetic reading head as mentioned here above.

In another embodiment of the invention, a reader of this kind is proposed comprising a case comprising, on a first face, a screen and/or a keypad and, on a second face, a housing capable of receiving a communications terminal. Furthermore, said case has a longitudinal slot for inserting a magnetic card, in the vicinity of which said reading head is placed.

LIST OF FIGURES

Other features and advantages of the invention shall appear from the following description given by way of an indicative and non-exhaustive example and from the appended drawings, of which.

DETAILED DESCRIPTION

In all the figures of the present document, the identical elements and steps are designated by a same numerical reference.

Figure 1:
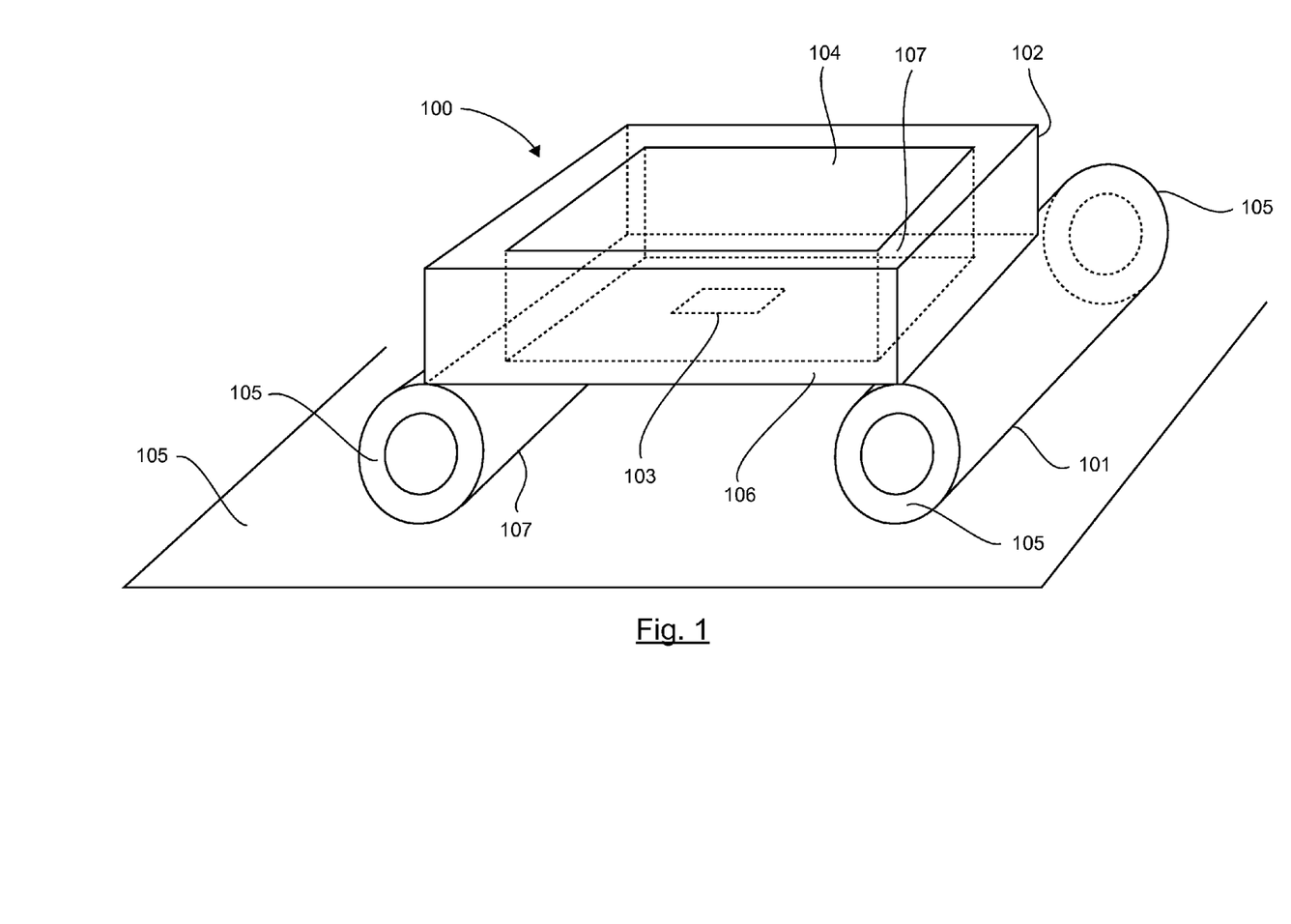
FIG. 1 presents a means for guiding and cushioning a magnetic reading head, included in a holding device according to a first embodiment of the invention.

FIG. 1 presents a means for guiding and cushioning 100 a magnetic reading head included in a holding device (not shown) according to a first embodiment of the invention.

In this embodiment, the means for guiding and cushioning are constituted by one and the same elastomer part obtained by a method of manufacture using, for example, a mold (with injection of material into the mold).

According to the first embodiment of the invention, the means for guiding and cushioning comprises two hollow supporting parts 101 in the shape of a cylinder of revolution, the bases 105 of which are mounted perpendicularly to the supporting plane 105, and the supporting parts of which are positioned parallel to each other. The fact of choosing such hollow supporting parts increases the elasticity of the guiding and cushioning means. In another embodiment, it is possible to choose supporting parts that have a same shape but are non-hollow. In order that the supporting parts of these two embodiments may be equivalent, it can be envisaged to bring into play the choice of the constituent material of these supporting parts.

According to the first embodiment of the invention, the means for guiding and cushioning the reading head comprise a part for receiving 102 in the shape of a rectangular parallelepiped or cube, of which one of the faces 106 is partly integral with portions of flanks of the supporting parts in the shape of cylinders of revolution. Thus, the part for receiving 102 is almost parallel to the supporting plane 105.

This part for receiving 102 is shaped like a rectangular parallelepiped or cube. It has a first slot 103 on the above-mentioned face 106. It also has an aperture 104 on the face 107 opposite the face 106 which is partly integral with the portions of the flanks of the supporting parts in the shape of cylinders of revolution. This aperture 104 opens out into a cavity 107 having dimensions chosen in such a way that they can receive a reading head (thus enabling the adjustment of the base of the reading head) and in such a way that the base of the reading head is in contact with the surface 106 (in other embodiments of the invention, the bottom of the cavity 107 does not coincide with the surface 106, in which case a slot in the bottom of the cavity 107 is present as also a tunnel linking this slot to the slot 103). Thus, the reading head is fixedly attached to the means for guiding and cushioning the magnetic reading head. Through the slot 103, a ribbon cable can be inserted into the reading head in order to enable the powering (as well as the transit of data read by the reading head) of the magnetic reading head to which it is connected by a first end (the second end of the cable being connected to a device capable of processing the information and of generating a current to power the magnetic reading head).

In another embodiment, the part for receiving 102 can have the shape of a cylinder of revolution, or the shape of a prism or any other type of shape in which a cavity (or housing) can be made for the insertion and/or adjustment of the base of the reading head.

Figure 2:
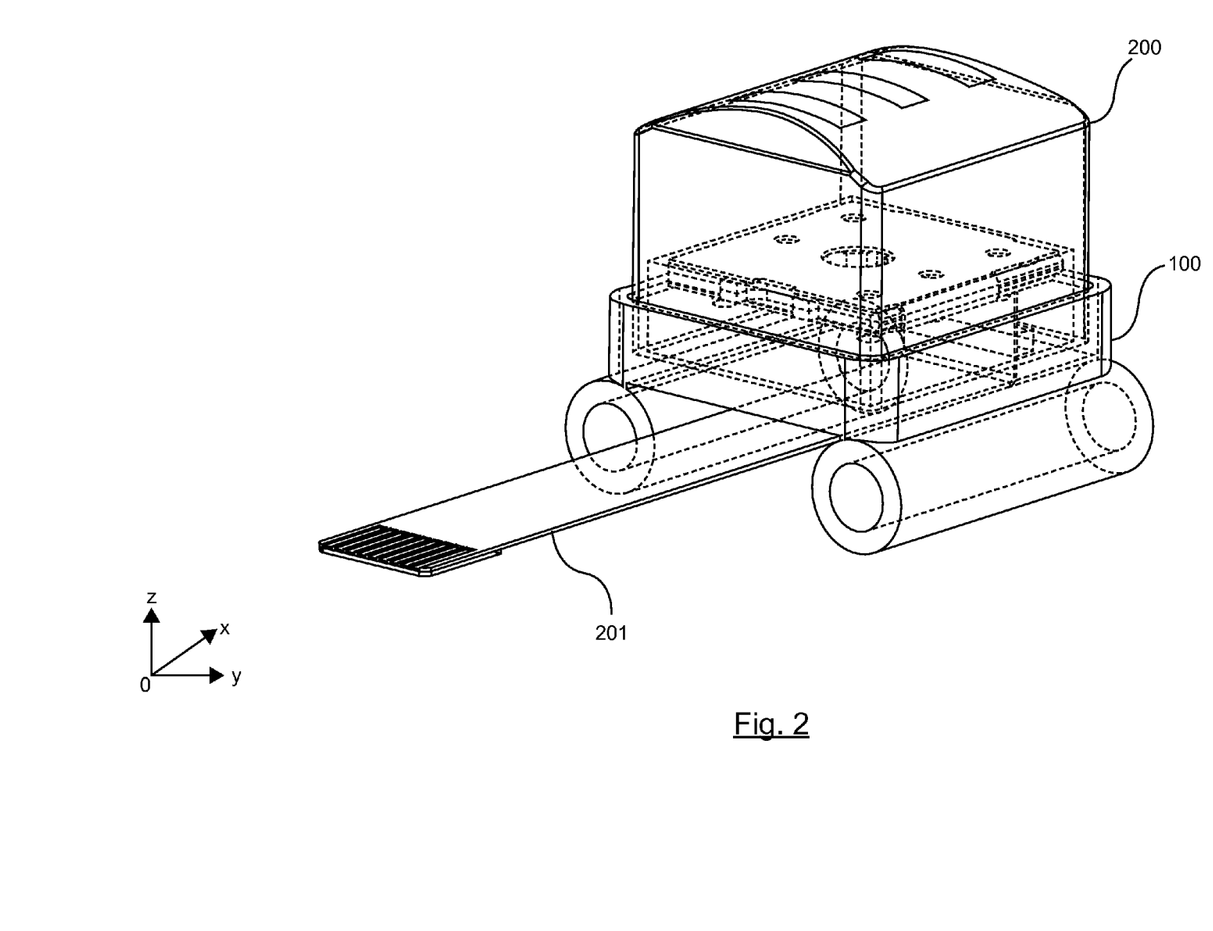
FIG. 2 presents a means for guiding and cushioning appearing in FIG. 1, adjusted with a reading head powered by a ribbon cable.

FIG. 2 shows a means for guiding and cushioning 100 appearing in FIG. 1, adjusted with a magnetic reading head 200 powered by a cable in the form of a ribbon cable 201.

When this means for guiding and cushioning is integrated into a payment terminal type of apparatus, a path guiding the magnetic card (also called a "swipe" guide (not shown in the figures)) exerts a slight pressure on the reading head (and therefore on the means for guiding and cushioning) in order to fix the supporting surface and the means for guiding and cushioning.

In another embodiment, it is possible to envisage the manufacture of the supporting parts 101 through the use of a first mold and the manufacture of the part for receiving 102 through the use of a second mold and then the bonding of these supporting parts 101 with the part for receiving 102 in order to obtain a means for guiding and cushioning having the same shape (and therefore similar technical characteristics during a motion of the magnetic reading head) as the means for guiding and cushioning described with reference to FIG. 1.

Figure 3:
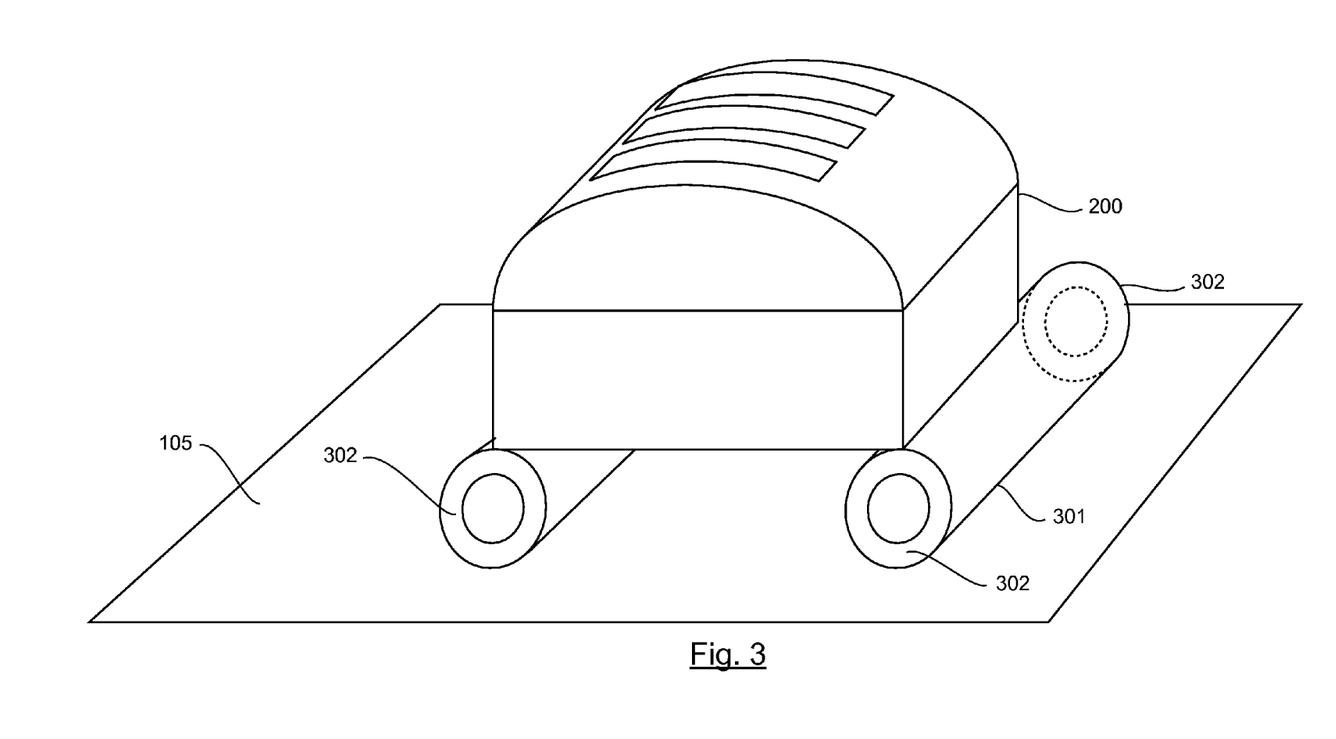
FIG. 3 presents a means for guiding and cushioning a magnetic reading head according to a second embodiment of the invention, in which the means for guiding and cushioning is constituted by two elements.

FIG. 3 shows a means for guiding and cushioning a magnetic reading head in a second embodiment of the invention, in which the means for guiding and cushioning is constituted by two supporting parts 301.

The two supporting parts 301, which are hollow, have the shape of a cylinder of revolution, the bases 302 of which are mounted perpendicularly to the supporting plane 105. Moreover, the supporting parts are situated so as to be parallel to one another. Unlike in the embodiment shown in FIGS. 1 and 2, the base of the magnetic reading head is fixed (for example with glue points) to portions of the flanks of the supporting parts. In another embodiment, it is possible to have several supporting parts which support the base of the reading head.

In the second embodiment of the invention, the supporting parts are made out of elastomer.

Figure 4:
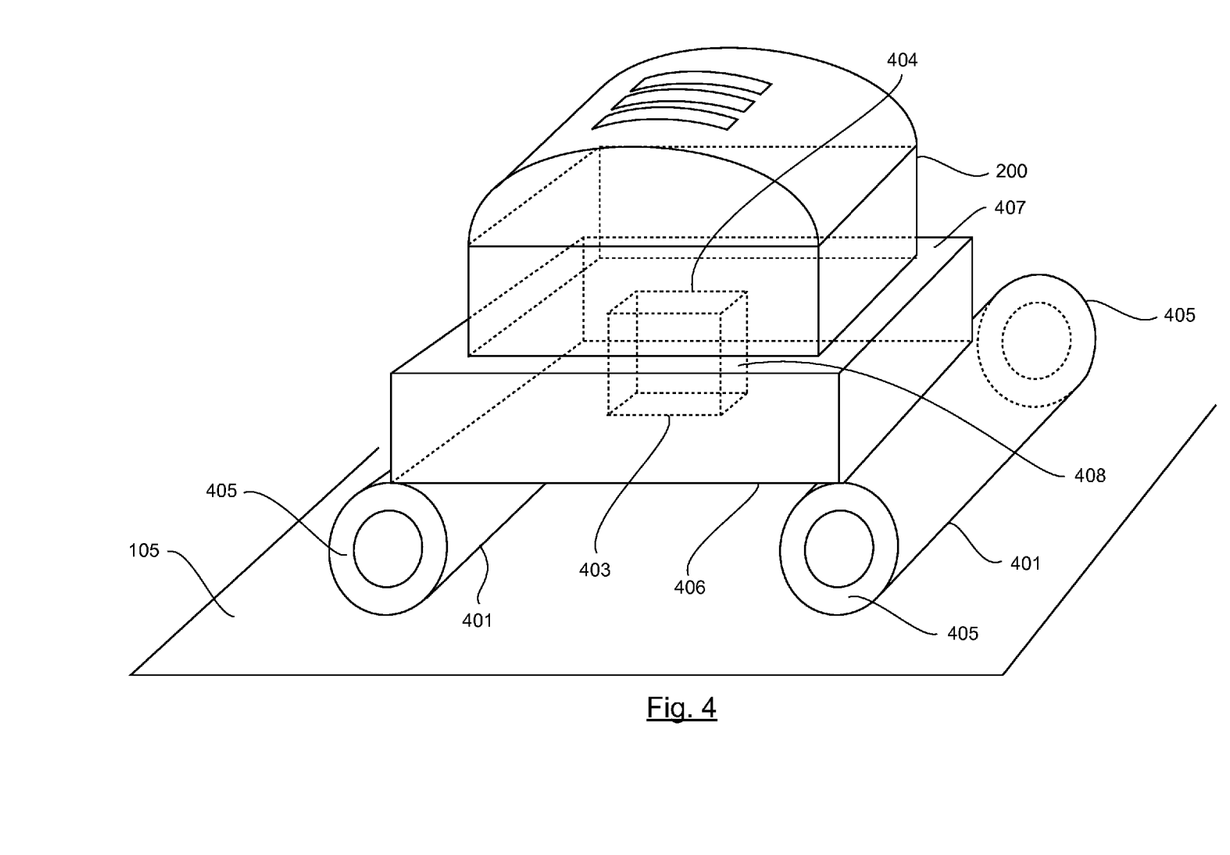
FIG. 4 presents a means for guiding and cushioning a magnetic reading head according to a third embodiment of the invention to which a magnetic reading head is attached.

FIG. 4 presents a means for guiding and cushioning a magnetic reading head in a third embodiment of the invention to which a magnetic reading head is attached.

In this embodiment, the means for guiding and cushioning is constituted by one and the same part made of elastomer, obtained by a method of manufacture by using for example a mold (by injecting the material into the mold).

According to the third embodiment of the invention, the means for guiding and cushioning comprise two solid supporting parts 401, in the shape of a cylinder of revolution, the bases 405 of which are mounted perpendicularly to a supporting plane 105, and the supporting parts of which are positioned parallel to one another. The means for guiding and cushioning furthermore comprise a reception means 402, in the shape of a rectangular parallelepiped or cube, of which one of the faces 406 is partly integral with the portions of the flanks of the supporting parts in the shape of a cylinder of revolution. Thus, the part for receiving 402 is almost parallel to the supporting plane 105.

This part for receiving 402 in the shape of a rectangular parallelepiped or cube has a first slot 403 on the above-mentioned face 406. It also has an aperture 404 on the face 407 opposite the face 406 in being partly integral with the portions of the flanks of the supporting parts in the shape of a cylinder of revolution. The slots 403 and 404 define a small cavity 408 enabling the passage of a ribbon cable to power the reading head 200 (and to receive the information read by the reading head).

In this embodiment of the invention, the base of the magnetic reading head is attached (through glue points) to the face 407 which is opposite the face 406 that is partly integral with the portions of the flanks of the supporting parts in the shape of a cylinder of revolution.

In another embodiment of the invention, the part for receiving 402 shaped like a rectangular parallelepiped or a cube can be replaced by any type of element possessing at least one plane part to receive the base of the magnetic reading head.

Figure 5:
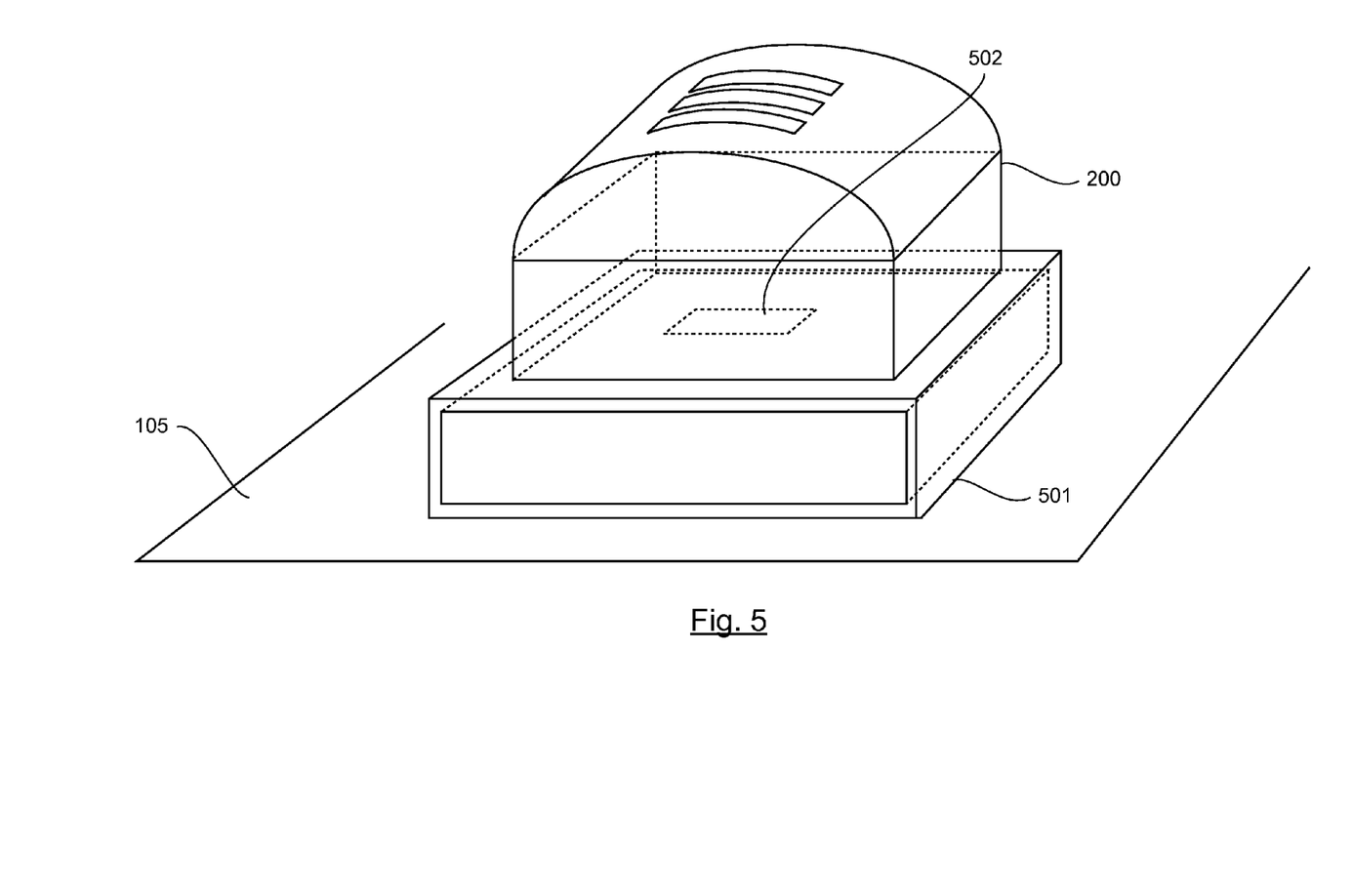
FIG. 5 presents a means for guiding and cushioning a magnetic reading head according to a fourth embodiment of the invention comprising a supporting part in the form of a hollow rectangular parallelepiped.

FIG. 5 shows a means for guiding and cushioning a magnetic reading head according to a fourth embodiment of the invention comprising a supporting part in the shape of a hollow rectangular parallelepiped.

In this embodiment, the means for guiding and cushioning is constituted by one and the same elastomer part obtained by a method of manufacture in using for example a mold (in injecting material into the mold).

According to the fourth embodiment of the invention, the means for guiding and cushioning comprises a single hollow supporting part 501, in the shape of a rectangular parallelepiped in contact through one of its faces with a supporting plane 105. The fact of choosing a hollow supporting part of this kind increases the elasticity of the means for guiding and cushioning. In another embodiment, it is possible to choose a supporting part having a cylinder shape and in this case a portion of the flank of the supporting part is in direct contact with the supporting part 105.

According to the fourth embodiment of the invention, the face opposite the face in contact for the supporting plane 105 comprises a slot 502. On this same face, the base of the magnetic reading head 200 is attached via glue points. The presence of the slot facilitates the connection between the magnetic reading head and a device for powering and processing information via a ribbon cable.

Those skilled in the art can easily adapt the embodiments of the invention presented in FIGS. 1 to 5 in order to obtain variants of the present invention. In particular, by modifying the structure of the reading heads (so that a magnetic reading head possesses a slot to let through a ribbon cable for powering the reading head no longer at the base of said head but on another side of the structure of the magnetic head), there can be another embodiment of the invention that does not include the slots of the embodiments described in FIGS. 1, 2, 4 and 5.

Those skilled in the art can also obtain variants of the present invention according to the choice of the material used (any type of solid viscoelastic material) and the shape and number of the supporting parts used to obtain a means for guiding and cushioning the magnetic reading head making it possible to ensure efficient reading of a magnetic card.

Finally, those skilled in the art can achieve a means for guiding and cushioning constituted by a cross-shaped support for the base of the reading head (obtained by laying out two supporting parts of a cylindrical shape).

FIGS. 6A to 6D present an example of a payment terminal comprising a magnetic card reader comprising a holding device for holding a magnetic reading head according to any unspecified embodiment of the invention.

The payment terminal (10) comprises two general sub-assemblies capable of being assembled, namely the payment device (20) and the communications device (30).

Figure 6A:
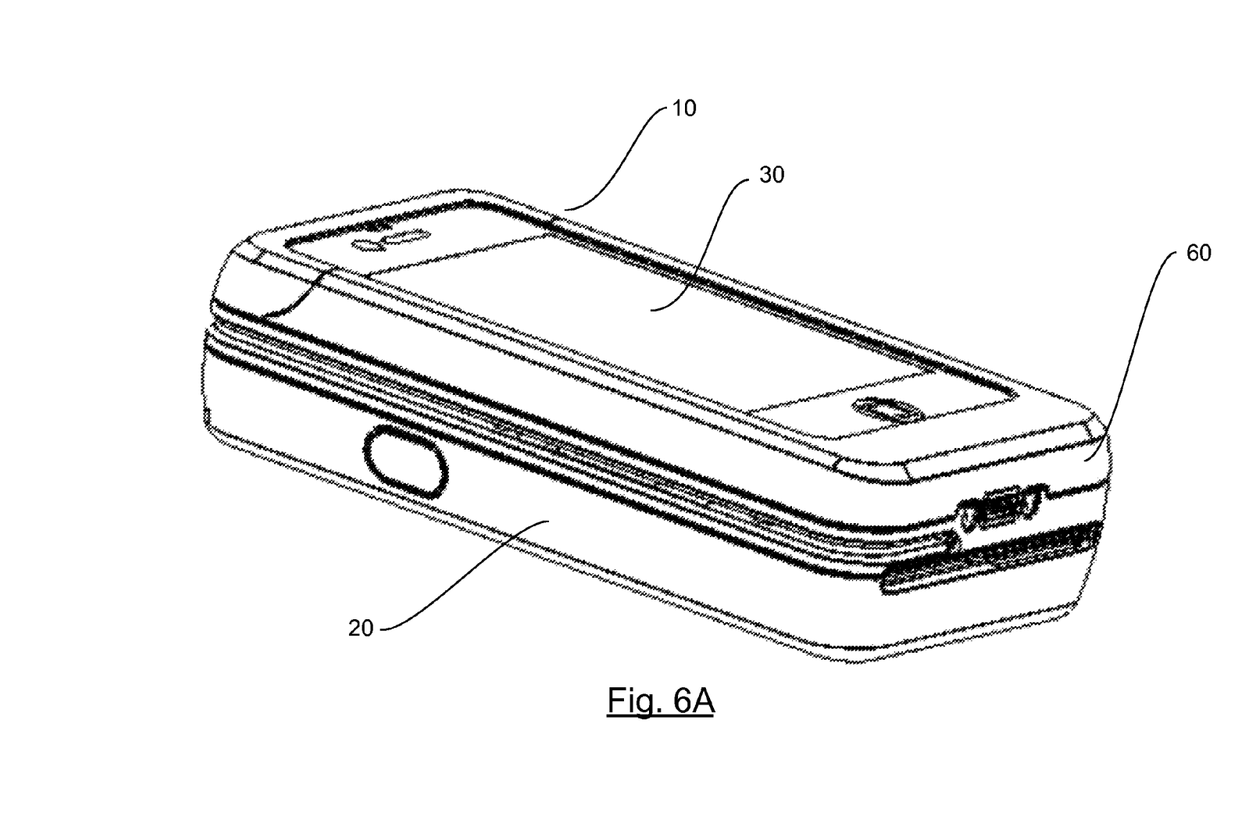
FIGS. 6A to 6D present an example of a payment terminal comprising a magnetic reading head comprising a device for holding a magnetic reading head according to any unspecified embodiment of the invention.
Figure 6B:
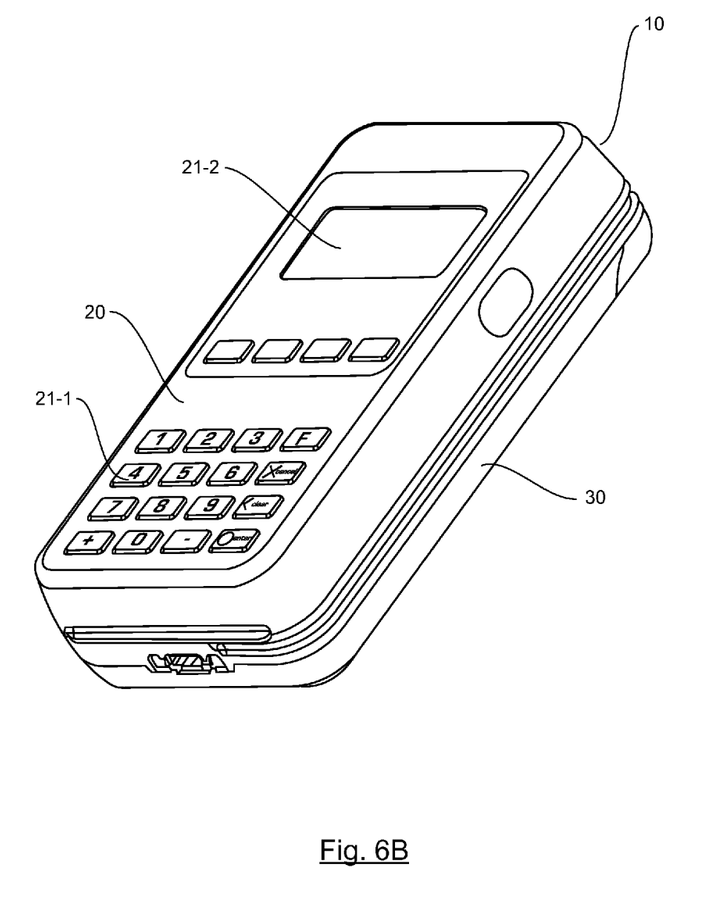
Figure 6C:
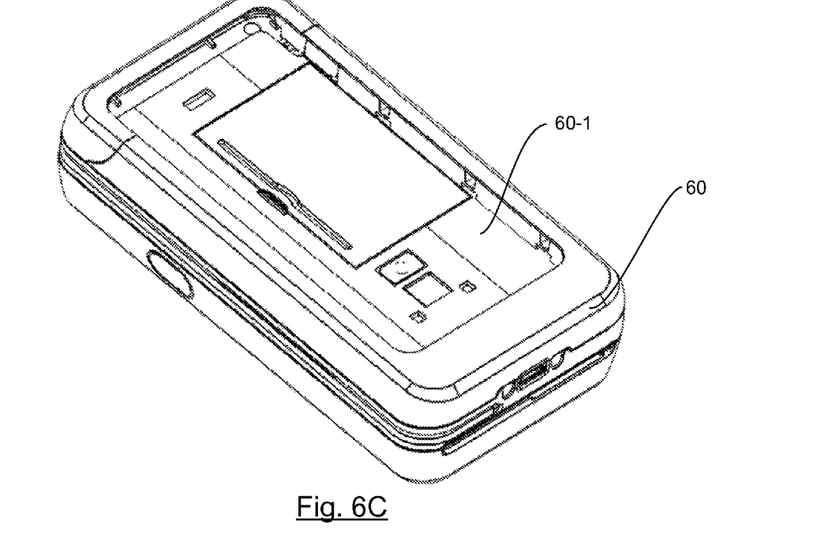

As illustrated, the payment device (20) has a front face, which can be seen in FIG. 6B, having a keypad to enter information (21-1) and a viewing screen (21-2) for viewing the entered information. The payment device comprises, on the rear face, which can be seen in FIG. 6D, an attachment surface (22) enabling the attachment of a modular interface (60) for pairing the communications device (30).

Figure 6D:
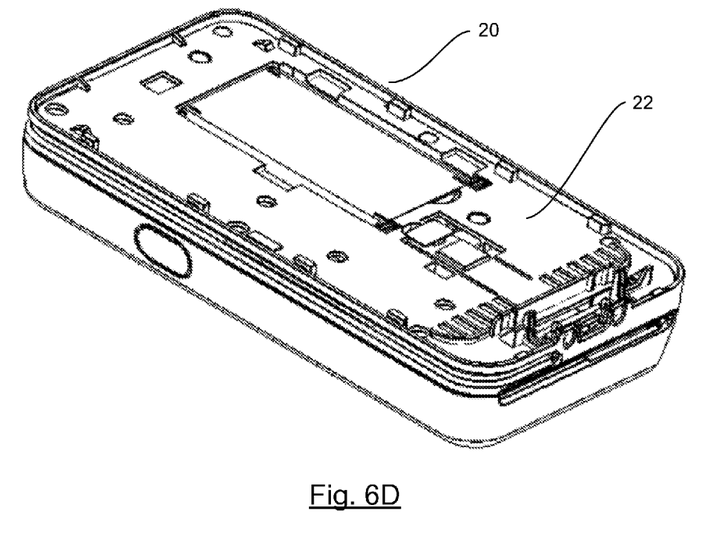

More particularly, a modular interface defines a housing (60-1) for inserting and pairing the communications device (30).

The payment device for its part is capable of fulfilling payment functions. To this end, the payment device (20) comprises, in addition to the keypad for keying in information (21-1) and the viewing screen (21-2) for viewing the keyed-in information, an upper half-shell (21-3) comprising the holes needed for the passage of the keys of the keypad (21-1) and an aperture to view the screen (21-2). The screen can also be touch-sensitive and fulfill the keypad function.

The payment device (20) also has a lower half-shell (21-4) which gets fixedly attached to the upper half-shell (21-3) to form the case of the payment device (20). The lower half-shell (21-4) defines the surface (22) enabling the attachment of the modular interface (60). The lower half-shell (21-4) comprises a housing (21-41) to insert a battery enabling the electrical supply of the payment device (20).

The lower half-shell (21-4) is also formed so that it has a slot (21-42) enabling the passage of a payment card comprising a magnetic track. Once the payment device has been assembled, this slot (21-42) extends on one of the flanks of the payment device (20) and enables the reading of the magnetic-tape payment card by a motion of translation of this card on the length of the payment device (20).

The lower half-shell (21-4) of the payment device (20) comprises an aperture (21-43) crossed by a magnetic reading head (24). This aperture (21-43) is shaped so that it enables a certain mobility of the magnetic reading head (24, 200). Thus, a reduced and possible clearance, providing this mobility, is made on the rim of the aperture. The magnetic reading head (24, 200) can thus move to a certain extent in order to ensure optimum reading of the information contained in the magnetic track of a payment card. This magnetic reading head (24, 200) is placed on the holding device comprising a means for guiding and cushioning the reading head in any unspecified embodiment of the invention (different embodiments are presented in FIGS. 1 to 5), and is connected to a motherboard (27) of the payment device by means of a ribbon cable.

The motherboard (27) is an electronic circuit comprising on a first face, in this embodiment, a set of microcircuits, especially one or more microprocessors and/or memories, as well as devices enabling the connection of the elements of the keyboard (21-1) and the viewing screen (21-2). On its second face, the motherboard comprises other microcircuits as well as a memory card reader (called an MC reader) (28). This reader (28) is configured to enable the insertion and reading of a payment card comprising a chip.

An unused volume (25) is present beneath the fastening surface (22) of the lower half-shell (21-4), laterally to the magnetic reading head (24).

In order to increase the security of the payment devices, a card is added, also called a "daughter board", making it possible, on the one hand, to secure the access to the internal components of the payment device and, on the other hand, to fulfill other ancillary functions of the payment device. This daughter board is situated beneath the fastening surface (22) enabling the fastening of a modular interface (60) for pairing the communications device (30). In other words, it is this daughter board that prevents access to the motherboard and prevents the insertion of a magnetic reading head.

Figure 7:
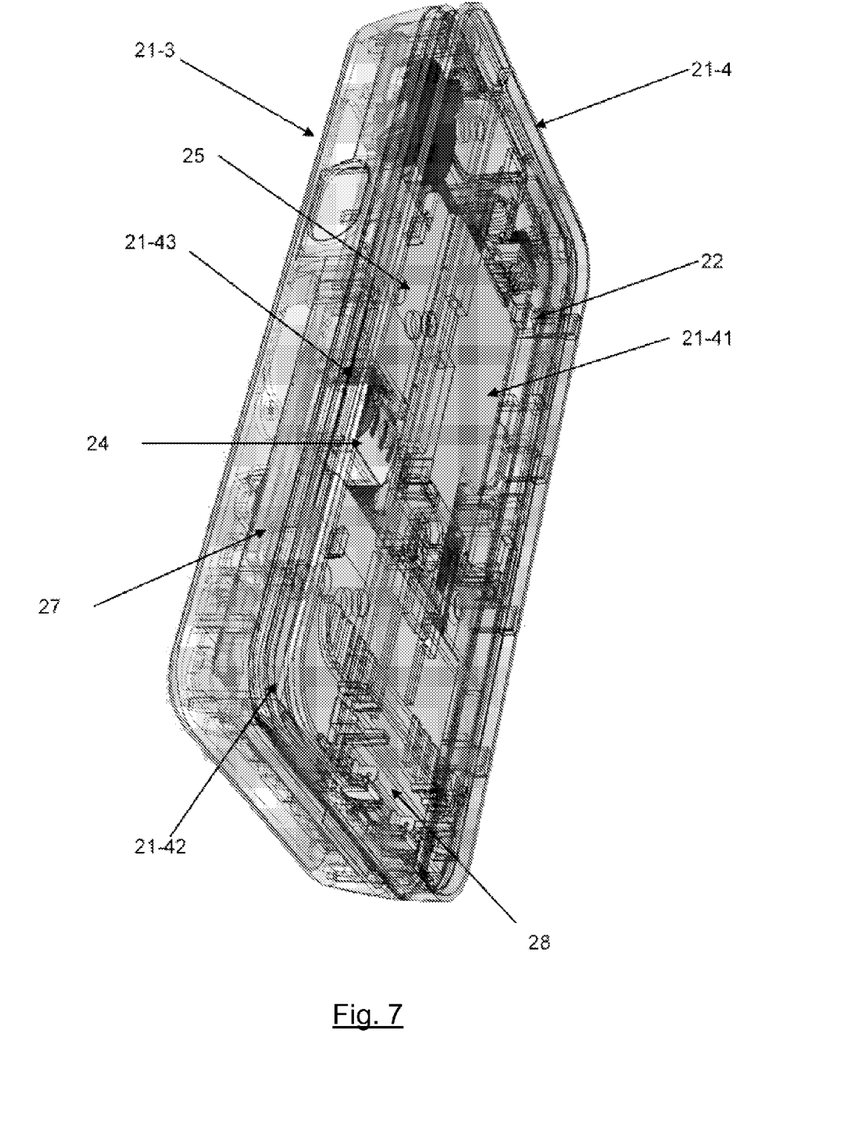
FIG. 7 presents the internal structure of a payment device presented in FIGS. 6A to 6D.

FIG. 7 presents the internal structure of the payment device presented in FIGS. 6A to 6D.

An embodiment of the present disclosure provides a device for holding a magnetic reading head that does not take up much space.

An embodiment provides a device of this kind for holding a magnetic reading head, for which the method of manufacture is simple to implement and can be obtained for low production cost.

An embodiment provides a device of this kind for holding a magnetic reading head, the layout of which, with such a head, can easily be made, without the performance of machining operations on a magnetic reading head.

An embodiment provides a device for holding that does not comprise mechanical parts constituting a drawback spring.

An embodiment provides a device for holding that can be used to protect the magnetic reading head (from a security point of view).

Although the present disclosure has been described with reference to one or more examples, workers skilled in the art will recognize that changes may be made in form and detail without departing from the scope of the disclosure and/or the appended claims.

The invention claimed is:

1. A device for holding a magnetic reading head, wherein the device comprises:
    a guide configured to guide and cushion said reading head, mounted between a base of the reading head and a supporting plane parallel to said base, comprising at least one part made out of a material possessing a modulus of elasticity greater than 200 N/mm$^2$, wherein said guide comprises at least one supporting part resting on the supporting plane made out of an elastomer material and having a cylindrical shape, the bases of which are positioned perpendicularly to the supporting plane.

2. The device according to claim 1, wherein said material belongs to the group consisting of silicones and thermoplastic elastomers.

3. The device according to claim 1, wherein said guide is a structure entirely made out of a material having a modulus of elasticity of over 200 N/mm$^2$.

4. The device according to claim 1, wherein said at least one cylinder-shaped supporting part is hollow.

5. The device according to claim 1, wherein the device comprises two said cylinder-shaped supporting parts which are similar and mounted so as to be parallel to each other.

6. The device according to claim 1, wherein said guide comprises a part for receiving the base of the reading head, resting on said at least one supporting part.

7. The device according to claim 6, wherein said part for receiving possesses a housing in which the reading head is embedded.

8. The device according to claim 6, wherein said part for receiving has a through aperture enabling passage of a connection element connected to the reading head.

9. A magnetic card reader comprising:
a device for holding a magnetic reading head wherein the device comprises:
a guide configured to guide and cushion said reading head, mounted between a base of the reading head and a supporting plane parallel to said base, comprising at least one part made out of a material possessing a modulus of elasticity greater than 200 N/mm$^2$, wherein said guide comprises at least one supporting part resting on the supporting plane made out of an elastomer material and having a cylindrical shape, the bases of which are positioned perpendicularly to the supporting plane.

10. The magnetic card reader according to claim 9, further comprising a case comprising, on a first face, at least one of a screen or a keypad and, on a second face, a housing configured to receive a communication terminal, and wherein said case has a longitudinal slot for inserting a magnetic card, in the vicinity of which said reading head is placed.

11. A magnetic card reader comprising:
a device for holding a magnetic reading head wherein the device comprises:
a guide configured to guide and cushion said reading head, mounted between a base of the reading head and a supporting plane parallel to said base, comprising at least one part made out of a material possessing a modulus of elasticity greater than 200 N/mm2, wherein said guide comprises at least one supporting part resting on the supporting plane made out of an elastomer material and having a cylindrical shape, the bases of which are positioned perpendicularly to the supporting plane,
and wherein the magnetic card reader further comprising a case comprising, on a first face, at least one of a screen or a keypad and, on a second face, a housing configured to receive a communication terminal, and wherein said case has a longitudinal slot for inserting a magnetic card, in the vicinity of which said reading head is placed.

* * * * *